June 5, 1956 S. LEVITT 2,749,484

FUNCTION TABLE

Filed March 31, 1952 3 Sheets-Sheet 1

INVENTOR.
SEMOND LEVITT

BY George [signature]

ATTORNEY

June 5, 1956 S. LEVITT 2,749,484

FUNCTION TABLE

Filed March 31, 1952 3 Sheets-Sheet 2

INVENTOR.
SEMOND LEVITT

BY

ATTORNEY

June 5, 1956

S. LEVITT 2,749,484

FUNCTION TABLE

Filed March 31, 1952

3 Sheets-Sheet 3

INVENTOR.
SEMOND LEVITT

BY George V. Eltgroth
ATTORNEY

United States Patent Office 2,749,484

Patented June 5, 1956

2,749,484

FUNCTION TABLE

Semond Levitt, Philadelphia, Pa., assignor to Sperry Rand Corporation, a corporation of Delaware Application March 31, 1952, Serial No. 279,715

7 Claims. (Cl. 317—99)

This invention relates generally to the transformation of electrical input signals into a selectively equal or unequal number of electrical output signals, and more particularly to the encoding or decoding of information for use in electrical typewriter systems, electrical computer systems and the like, and to the construction of a table to perform the function of such encoding or, if used in reversed connections, decoding.

While the invention, for convenience, is referred to as a function table, it should be understood, however, that the invention comprises the set up of the encoding or decoding circuits as well as the physical construction and embodiment of the device. It also should be noted, that the invention may be used in any electrical system other than typewriter or computer systems wherever a transformation of input signals into a selectively equal or unequal number of output signals is required. The invention is exemplified, however, in its application to electrical typewriter or computer systems.

The invention is especially useful in connection with such computer systems where electronic representation is employed and where quantitative significance is imparted to separate entries by spacing them in time rather than employing separate circuits for handling them. In this way, only a single set of information processing apparatus is required to handle any group entry, no matter how many individual elements or digits may be present in the group entry. Time has quantitative significance within such a system, that is, the various pulse times have different numerical significance, the earliest pulses corresponding to least significant digits while the later occurring pulses in a combination represent the more significant digits.

In addition to placing numerical quantities in time they are expressed in values of the binary system. The numerals of the binary system are also used as the constituents of a code for which the attached representative code gives an example.

*Pulse combination code*

| Pulse Code | Character | | Pulse Code | Character | |
|---|---|---|---|---|---|
| | lower case | upper case | | lower case | upper case |
| 1 01 0100 | a | A | 1 00 0011 | 0 | ) |
| 0 01 0101 | b | B | 0 00 0100 | 1 | ½ |
| 0 01 0110 | c | C | 1 00 0101 | 2 | " |
| 1 01 0111 | d | D | 1 00 0110 | 3 | # |
| 1 01 1000 | e | E | 0 00 0111 | 4 | $ |
| 0 01 1001 | f | F | 0 00 1000 | 5 | % |
| 0 01 1010 | g | G | 1 00 1001 | 6 | * |
| 1 01 1011 | h | H | 1 00 1010 | 7 | & |
| 0 01 1100 | i | I | 0 00 1011 | 8 | ' |
| 1 10 0100 | j | J | 1 00 1100 | 9 | ( |
| 0 10 0101 | k | K | 1 01 0010 | period | (.) |
| 0 10 0110 | l | L | 1 01 0001 | comma | (,) |
| 1 10 0111 | m | M | 0 01 0011 | (;) | (:) |
| 1 10 1000 | n | N | 0 00 0010 | minus | (-) |
| 0 10 1001 | o | O | 0 11 0100 | * | @ |
| 0 10 1010 | p | P | 0 10 0011 | / | ? |
| 1 10 1011 | q | Q | 1 00 0000 | ignore | |
| 0 10 1100 | r | R | 0 00 0001 | space | |
| 1 11 0101 | s | S | 0 10 0000 | tabulation | |
| 1 11 0110 | t | T | 0 01 0000 | carriage return | |
| 0 11 0111 | u | U | 0 11 1101 | single character shift | |
| 0 11 1000 | v | V | 1 10 1101 | shift lock | |
| 1 11 1001 | w | W | 0 10 1111 | unshift | |
| 1 11 1010 | x | X | | | |
| 0 11 1011 | y | Y | 0 11 0001 | printer breakpoint | |
| 1 11 1100 | z | Z | 1 11 0000 | printer stop | |

It is a primary object of this invention to provide the means for transforming electrical input signals into a selectively equal or unequal number of properly directed output signals.

It is a more specific object of this invention to provide a function table which encodes signals or, if operated in the reverse direction, decodes signals.

It is a further object of this invention to provide a function table which, due to its novel and unusually economic design, requires a minimum of space and can be machined and assembled with a minimum effort and at minimum cost.

Other objects of the invention will in part be described and in part be obvious when the following specification is read in conjunction with the drawings in which.

For a clearer understanding of the particular circuit arrangements shown in the accompanying drawings, and for convenience in describing the circuits in detail, typical values for the potentials of the various power sources have been given. Reference to these potentials is, therefore, intended to indicate appropriate power sources. It will be understood, of course, that the potential values are given by way of illustration only, and that they may be varied depending upon the specific circuit conditions. Positive voltage sources are identified by even numbers of like voltage, negative voltage sources by odd numbers of like voltage.

It should be understood, however, that the invention is represented in the specific function or functions of any individual circuit and in the basic relationships between the different circuits. It may, therefore, be regarded as obvious that any change in the set-up of the apparatus is inessential as long as such change does not affect such functions or basic relationships.

Figure 1:
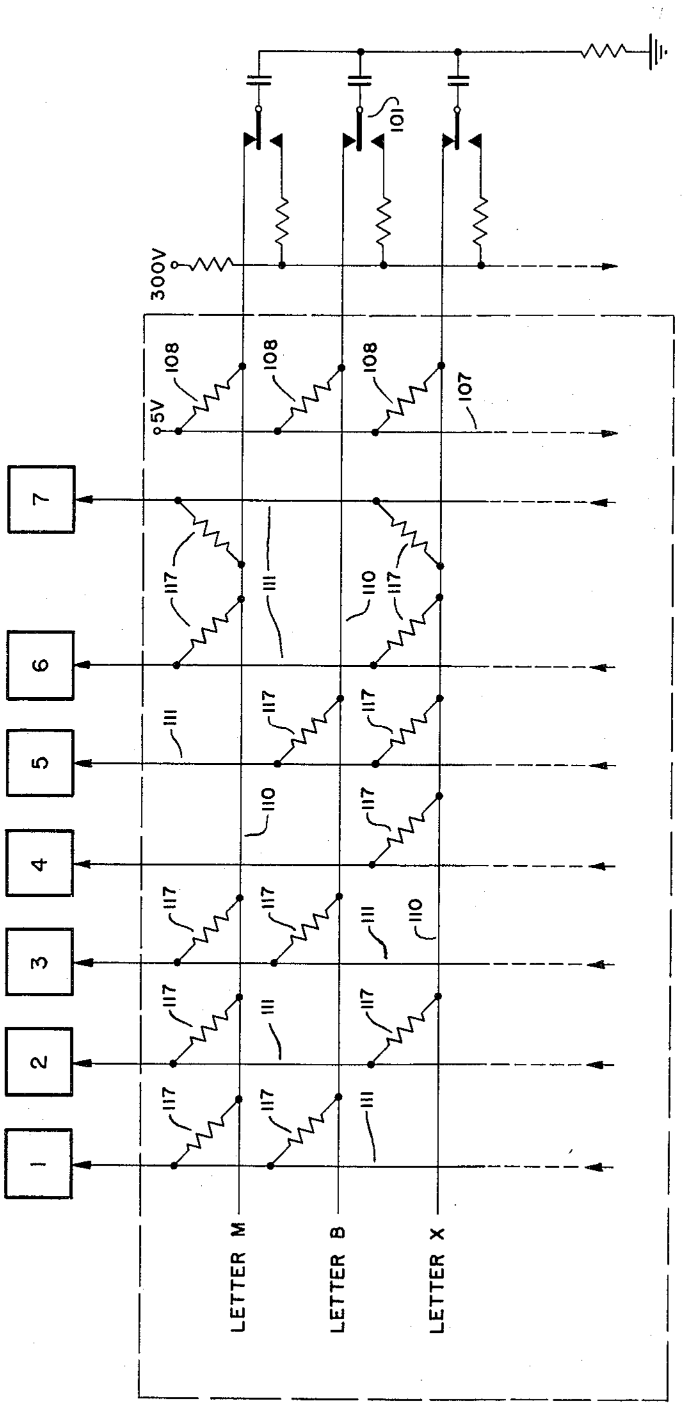
Figure 1 is a schematic diagram of the circuits in the function table.

The function table comprises input lines coming, for example, from a keyboard and output lines going, for example, to recording devices and the like. The function table, as shown in Figure 1, consists of as many input lines 110 as there are characters on the keyboard and of seven output lines 111. The input lines of which only three lines are shown as an illustration originate at the keyboard keys while the seven output lines, in the given example, control the grids of seven recording thyratrons.

At selected intersections between the input lines and the seven output lines 100K resistors 117 are placed. Whitch input lines and which output lines are interconnected and which are not, is determined by the specific binary code combination assigned to each of the characters on the keyboard. The pulse code of each individual character is, therefore, represented by the array of fired and unfired thyratrons. The fired thyratrons effect a "one" while the unfired thyratrons represent a "zero."

To record a "B," for example, for which the representative code provides a 0010101, a positive-going pulse is applied through operation of key 101 to the input line for the letter "B." This input line is connected through three 100K resistors 117 to three output lines which lead to the control grids of the thyratrons 1, 3 and 5. The control grid of each thyratron is biased at −5 volts through supply line 107. The positive-going keyboard pulse, which has an amplitude of approximately +16 volts, causes thyratrons 1, 3 and 5 to conduct and to supply current for the corresponding recording head coils. Further details of the recording operation need no discussion in connection with the present invention.

Figure 2:
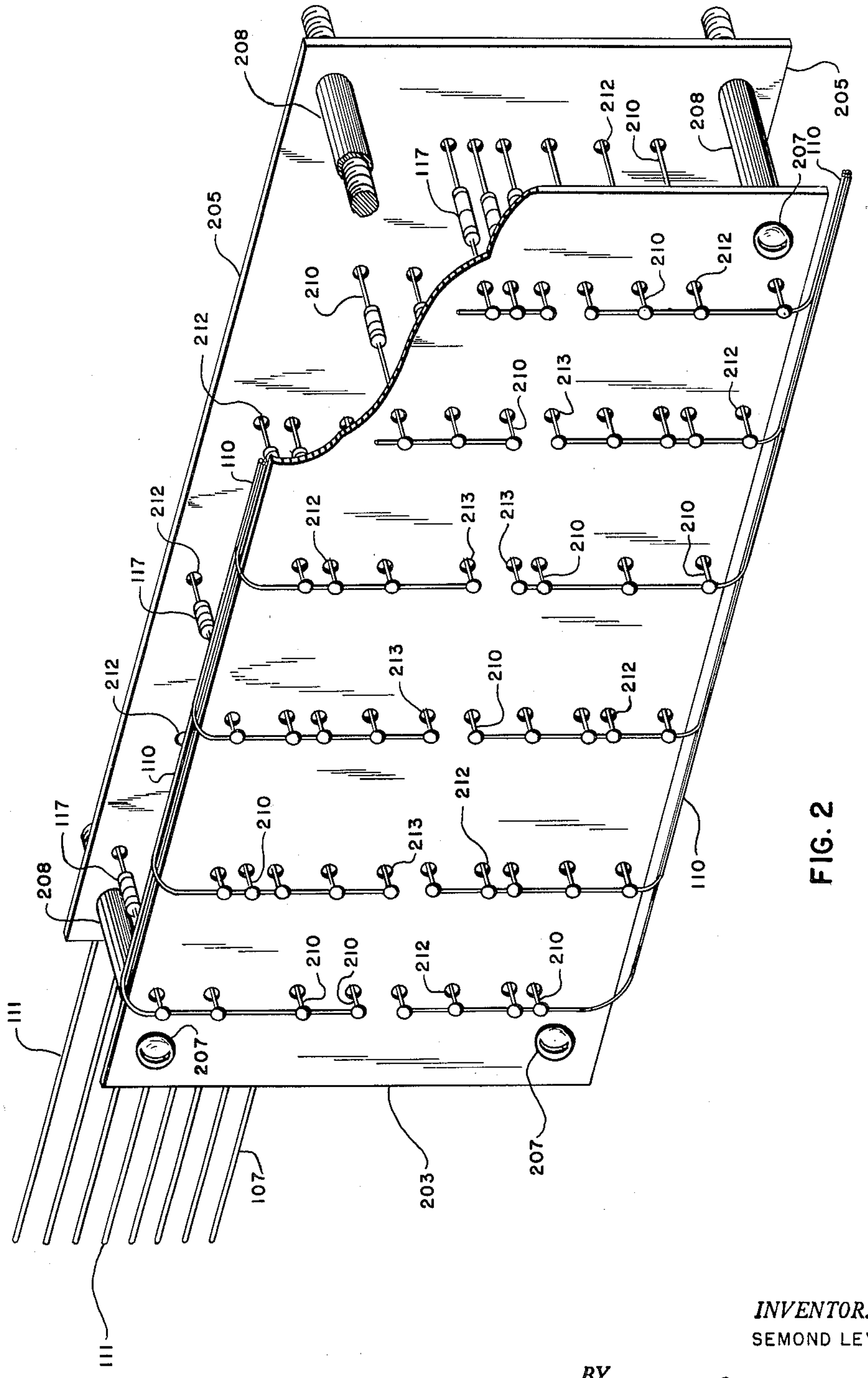
Figure 2 is a perspective front view of the function table.
Figure 3:
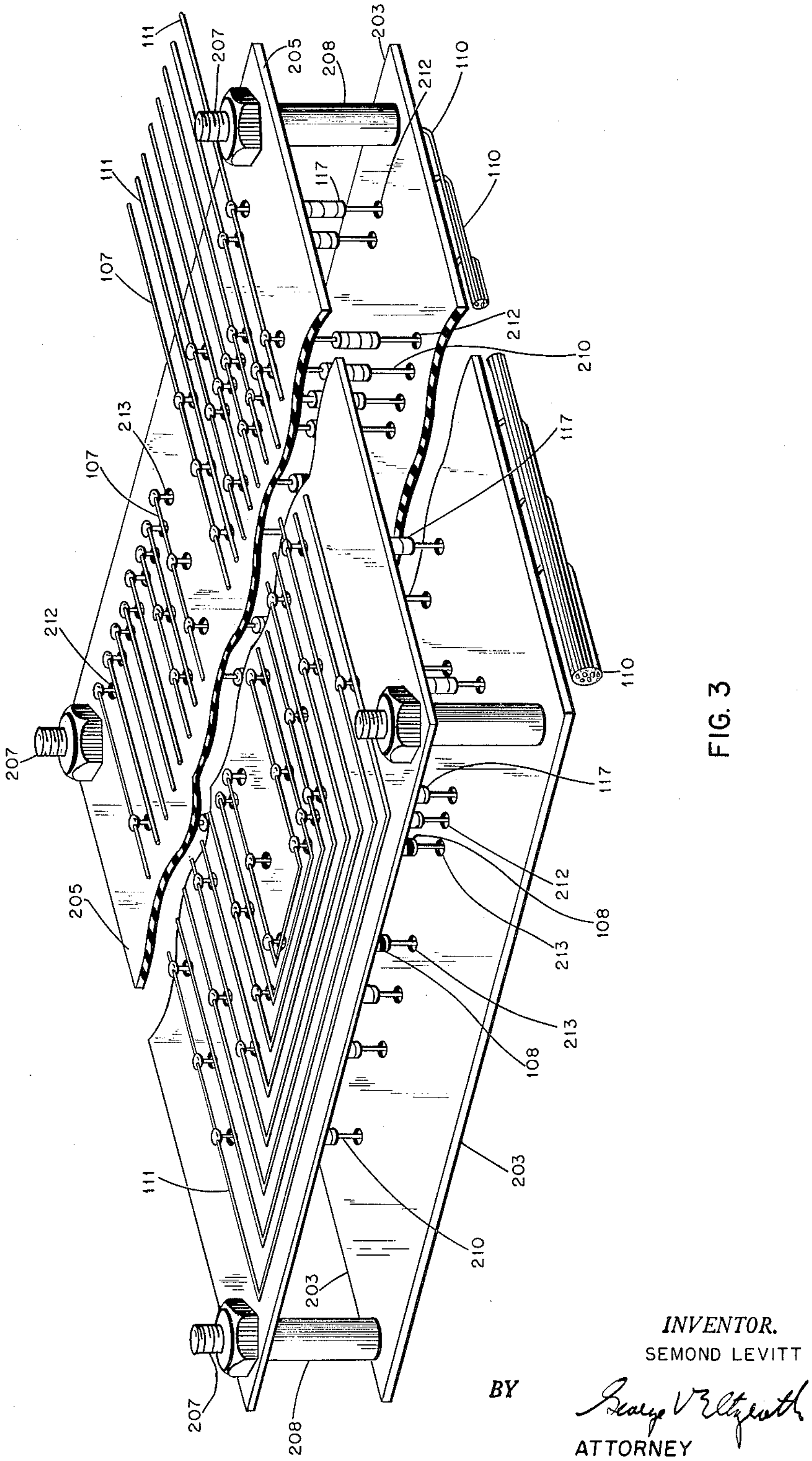
Figure 3 is a perspective back view of the function table.

In addition to this selective signal transformation system the invention provides a specific mounting arrangement of its members which is exemplified in Figures 2 and 3. The encoding table comprises two boards 203 and 205, as shown in Figure 2, made of insulating, preferably, synthetic material as, for example, Bakelite. The boards are of equal size, preferably about 12 inches long and about six and one-half inches wide, and are positioned in parallel planes about one and a quarter inches apart by means of bolts 207 and spacers 208, as shown in Figure 2.

The terminals of the input lines 110 are mounted vertically on the outer side of the front board 203 in two groups, as indicated in Figure 2, one group covering the upper section and the other group covering the lower section of the board. As a result, each of the two groups comprises one half of the total input lines and is so located that the selective connections to the output lines are effeced within a limited total space. The number of the input lines corresponds to the number of characters on the keyboard which varies according to specifications. Provisions are made, in the exemplified case, for the possible use of sixty input lines. The drawings, for reasons of simplification, show a much smaller number of input lines than actually installed. The terminals of the seven output lines 111 are mounted horizontally on the outer side of the back board 205, as shown in Figure 3, covering circuitously first the upper section and then the lower section of the board in correspondence to the grouping of the input terminals. In addition to the seven output lines, there is also the bias supply line 107, as shown in Figures 1 and 3.

At selected points 100K resistors 117 are positioned in the open space between the two boards with crosswires 210 which, through holes 212 in the boards, connect the input lines 110 with the output lines 111. Such selection of connection points is made in accordance with the specific binary code combination assigned to every individual input line coming from the corresponding keyboard key. While the connection of the input lines to the output lines is a selective one, all input lines 110 are equally connected through holes 213 and 2.2K resistors 108 to the bias supply line 107, as shown in Figures 1, 2 and 3. This bias supply line 107 could be installed outside of the function table since said connections through resistors 108 are not a part of the function table proper. It represents, however, a separate additional feature of this invention to use the function table as a convenient location for mounting the bias supply line resistors 108.

It is self-evident that the positions of the input and output lines may be reversed without any change in the functional effects of the arrangement.

The function table may be operated as part of an electrical input system which records and stores coded information in the form of pulses on a magnetized tape. Such an electrical input system is disclosed and claimed by Herbert Frazer Welsh, John Presper Eckert, Jr., and Edwin I. Blumenthal in patent application Serial No. 279,712, filed March 31, 1952, entitled Information Translating Apparatus.

What is claimed is:

1. An article of manufacture comprising, a first plurality of conductors, a second plurality of conductors mounted in the same plane as, but opposite to said first plurality of conductors, a third plurality of conductors spaced from said first and second pluralities of conductors and presenting intersecting arrays in projection on said first and second pluralities of conductors, a plurality of flat apertured insulating members interposed between said first and second pluralities of conductors and said third plurality of conductors and disposed in spaced, substantially parallel planes, and coupling elements positioned between said insulating members and interconnecting selected conductors in said first and second pluralities of conductors with selected conductors in said third plurality of conductors through the apertures in said insulating members.

2. The combination according to claim 1 in which apertures exist in said plurality of insulating members at a selected number of array intersections less than the whole number of such intersections.

3. The combination according to claim 1 in which said third plurality of conductors is disposed transversely relative to said first and second pluralities of conductors wherein sections of conductors in said third plurality of conductors present an intersecting array in projection on said first plurality of conductors and other sections of the same conductors in said third plurality of conductors present an intersecting array in projection on the said second plurality of conductors.

4. The combination according to claim 1 in which the first and second pluralities of conductors comprise input lines and the third plurality of conductors comprises output lines, and in which a supply line is included in any of said pluralities of conductors and connected through coupling members to every line in the intersecting plurality of conductors.

5. The combination according to claim 1 in which the said third plurality of conductors comprises input lines and the said first and second pluralities of conductors comprise output lines and in which a supply line is included in any plurality of conductors and connected through coupling members to every line in the intersecting plurality of conductors.

6. The combination according to claim 1 in which said coupling elements are impedance elements.

7. An article of manufacture comprising a first plurality of conductors, a second plurality of conductors, in which said first plurality of conductors and said second plurality of conductors are disposed in separate and opposite groups within the same plane, and a third plurality of conductors spaced from said first and second pluralities of conductors, in which said third plurality of conductors is disposed transversely relative to said first and second pluralities of conductors and sections of conductors in said third plurality of conductors present an intersecting array in projection on said first plurality of conductors and other sections of the same conductors in said third plurality of conductors present an intersecting array on said second plurality of conductors, a plurality of flat apertured insulating members interposed between said first and second pluralities of conductors and said third plurality of conductors and disposed in spaced, substantially parallel planes, and impedance elements positioned between said insulating members and interconnecting selected conductors in said first and second pluralities of conductors with selected conductors in said third plurality of conductors through the apertures in said insulating members.

References Cited in the file of this patent

UNITED STATES PATENTS

| | | |
|---|---|---|
| 252,395 | Odell | Jan. 17, 1882 |
| 947,956 | Agutter | Feb. 1, 1910 |
| 1,168,774 | Adam | Jan. 18, 1916 |
| 2,019,625 | O'Brien | Nov. 5, 1935 |
| 2,444,037 | Fritschi | June 29, 1948 |
| 2,558,008 | Smith | June 26, 1951 |
| 2,596,237 | Gross | May 13, 1952 |